(12) United States Patent
Acar et al.

(10) Patent No.: US 7,243,899 B2
(45) Date of Patent: Jul. 17, 2007

(54) VALVE ARRANGEMENT

(75) Inventors: Sezgin Acar, Ludwigsburg (DE); Heike Bauer, Stuttgart (DE); Ralf Schindler, Leonberg (DE); Klaus Heyer, Freiberg (DE); Massimiliano Ambrosi, Marbach (DE); Frank Entenmann, Oberstenfeld (DE); Dietmar Kratzer, Tamm (DE); Daniel Zuewerink, Ingolstadt (DE)

(73) Assignee: Robert Bosch GmbH, Stuttgart (DE)

( * ) Notice: Subject to any disclaimer, the term of this patent is extended or adjusted under 35 U.S.C. 154(b) by 86 days.

(21) Appl. No.: 11/173,161

(22) Filed: Jul. 5, 2005

(65) Prior Publication Data
US 2006/0027774 A1    Feb. 9, 2006

(51) Int. Cl.
*F16K 31/02* (2006.01)
(52) U.S. Cl. ............... 251/129.07; 251/129.02; 335/279
(58) Field of Classification Search ........... 251/129.02, 251/129.15, 129.07, 282; 303/119.1, 119.2; 335/267, 279
See application file for complete search history.

(56) References Cited

U.S. PATENT DOCUMENTS

| | | | |
|---|---|---|---|
| 5,603,483 A * | 2/1997 | Reuter et al. | 251/129.02 |
| 6,113,066 A * | 9/2000 | Hohl et al. | 251/129.02 |
| 6,238,014 B1 * | 5/2001 | Tamai et al. | 303/119.2 |
| 6,305,583 B1 * | 10/2001 | Ward et al. | 222/504 |
| 6,471,305 B1 * | 10/2002 | Leventhal et al. | 303/119.2 |

* cited by examiner

*Primary Examiner*—Eric Keasel
*Assistant Examiner*—John K. Fristoe, Jr.
(74) *Attorney, Agent, or Firm*—Ronald E. Greigg

(57) ABSTRACT

An electromagnetic valve arrangement with a valve element having least one part disposed in a valve chamber defined by a valve insert in the region of a valve seat. An end facing away from the valve chamber of the valve element is operatively connected to an armature and end face of the armature facing toward the valve insert and/or an end face of the valve insert facing toward the end face of the armature is embodied with a surface profile such that a flow cross section, defined by the opposed end faces varies at least regionally in the radial direction and/or in the circumferential direction of the armature.

4 Claims, 2 Drawing Sheets

VALVE ARRANGEMENT

BACKGROUND OF THE INVENTION

1. Field of the Invention

The invention relates to an improved electromagnetically actuated valve arrangement of the type useful, for example, in brake systems for motor vehicles.

2. Description of the Prior Art

From German Patent Disclosure DE 100 36 576 A1, an electromagnetically actuatable valve arrangement which is usable particularly in hydraulic brake systems of motor vehicles is known. The valve arrangement includes a valve insert embodied with a longitudinal bore and solidly connected to a valve dome. Disposed in the valve dome is an armature, longitudinally movable in the axial direction of the valve arrangement, that is operatively connected to a valve tappet guided longitudinally movably, likewise in the axial direction, in the valve insert. The operative connection between the armature and the valve tappet or the valve element is such that an armature motion in the closing direction of a valve seat is transmitted to the valve tappet embodied with a closing member, so that a seat valve is closed upon contact of the closing member with a valve seat.

The valve tappet is guided with slight radial play in the longitudinal bore of the valve insert and is provided on its jacket side with at least two conduits, separate from one another. A valve chamber containing the seat valve of the valve arrangement communicates fluidically through the conduits with voids inside the valve dome, so that residual air in the valve dome can be positively displaced via the conduits.

The valve arrangement, in the currentless state, is furthermore kept in the opened state by a spring assembly or a restoring spring; the spring assembly, embodied as a compression spring, is built into the valve chamber. This disposition of the spring assembly assures simple assembly of the valve arrangement.

By actuation of the valve arrangement which is open when without current, the armature is displaced with the valve element. Between the voids, which are defined on the end facing away from the valve element by the valve dome and the armature and in the contact region of the armature on the valve element by the armature, the valve element, the valve dome, and the valve insert, a volumetric and pressure compensation takes place, which in operation of the valve arrangement is associated with a flow of the operating fluid located in the interior of the valve arrangement.

The fluid flow, in unfavorable operating states of the valve arrangement, in the region of the end faces, facing toward one another, of the armature and of the valve insert, leads to an unwanted motion of the armature and thus also of the valve element in the direction of the valve seat, which is due to an effect of the hydrodynamic paradox that occurs between the end faces of the armature and of the valve insert.

This unwanted motion of the armature and of the valve element in the direction of the valve seat leads, in operation of the valve arrangement, to an uncontrollable change in location of the armature and also of the valve element, which under some circumstances leads to an unwanted change in the flow cross section of the valve arrangement in the region of the valve seat, and as a result an open-and closed-loop control characteristic of the valve arrangement can be verified or replicated only with difficulty.

SUMMARY AND ADVANTAGES OF THE INVENTION

In the valve arrangement of the invention, which is embodied having a valve element is disposed longitudinally movably in a valve insert and cooperating with a valve seat embodied in a valve body, which valve element in the installed position of the spring assembly is acted upon with a force component acting in the opening direction of the valve seat and can be actuated in the closing direction of the valve seat via an electromagnetic actuator, where at least part of the valve element is disposed in a valve chamber defined by a valve insert in the region of the valve seat, and an end, facing away from the valve chamber, of the valve element is operatively connected to an armature, an unwanted and uncontrollable change in location of the armature and of the valve element relative to the valve seat in the operation of the valve arrangement is avoided in a simple way.

This is attained by providing that an end face of the armature facing toward the valve chamber, and/or an end face of the valve insert facing toward the end face of the armature is embodied with a surface profile such that a flow cross section, defined by the end faces, varies at least regionally in the radial direction and/or in the circumferential direction of the armature. This means that the end face of the armature and/or the end face of the valve insert is altered, in comparison to the valve arrangements known from prior art, in such a way that no uniform spacing exists between the end faces of the armature and of the valve insert over the full armature diameter, and thus the foundations for the occurrence of effects of the hydrodynamic paradox do not exist. Thus advantageously neither the position of the armature nor the position of the valve element relative to the valve seat is changed by unwanted effects in the interior of the valve arrangement, and as a result the positions of the armature and of the valve insert are controllable to the extent required for perfect functioning of the valve arrangement.

BRIEF DESCRIPTION OF THE DRAWINGS

Further advantages and advantageous refinements of the subject of the invention will become apparent from the description contained herein below, taken in conjunction with the drawings, in which.

DESCRIPTION OF THE EXEMPLARY EMBODIMENTS

Figure 1:
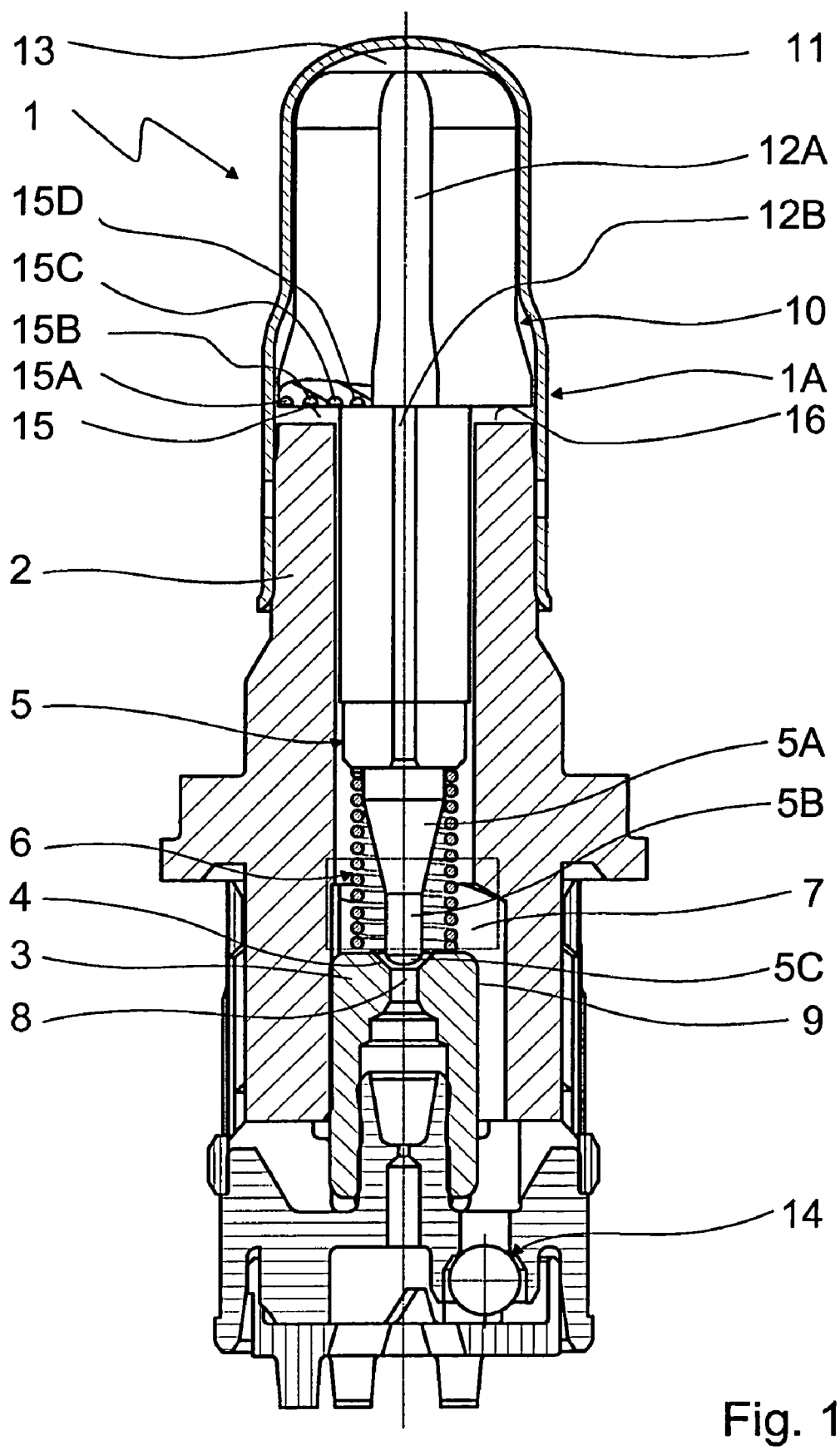
FIG. 1 is a schematic longitudinal section through a valve arrangement embodied according to the invention.

In FIG. 1, the valve arrangement 1 is embodied with a valve element 5 that is disposed longitudinally movably in a valve insert 2 and that cooperates with a valve seat 4 embodied in a valve body. In the installed position, the valve element 5 is acted upon by a spring assembly 6 with a force component acting in the opening direction of the valve seat 4. The valve element 5 is furthermore actuated in the closing direction of the valve seat 4 via an electromagnetic actuator, not shown in detail.

A region of the valve element 5 oriented toward the valve seat 4 is disposed in a valve chamber 7, which is defined by the valve insert 2 in the region of the valve seat; the dimensions of this chamber are shown as a rectangle drawn in dot-dashed lines in FIG. 1. The region of the valve element 5 disposed in the valve chamber 7 has a frustoconical region 5A, a first cylindrical region 5B adjoining the frustoconical region 5A, and a third conical-caplike region 5C in turn adjoining the first cylindrical region 5B. The conical-caplike region 5C of the valve element 5 cooperates with the conically embodied valve seat 4 in such a way that upon contact of the valve element 5 on the valve seat 4, a sealing action prevails of a kind such that an inflow region 8 of the valve chamber 7 and an outflow region 9 of the valve chamber 7 are disconnected from one another when the valve seat 4 is closed.

The valve arrangement 1 substantially comprises the hydraulic module 1A, shown in FIG. 1, and an electrical module, slipped onto the hydraulic module 1A and not further shown, which is embodied in a manner known per se with a coil, an electric winding, and a yoke ring disk, in order to actuate an armature 10 of the hydraulic module 1A, as a so-called electromagnetic actuator, in the closing direction of the valve seat 4 counter to the spring force of the spring assembly 6.

In the present case, the armature 10 is guided longitudinally displaceably in a valve dome 11 solidly connected to the valve insert 2, and together with the valve dome 11 it defines a plurality of conduits 12A, which connects a valve dead space 13, defined between the valve dome 11 and the end of the armature facing away from the valve seat 4, to the valve chamber 7 via tappet grooves 12B of the valve element 5.

The valve element 5, in the currentless state of the valve arrangement 1, is thrust away from the valve seat 4 in the direction of the valve dead space 13 by the spring force of the spring assembly 6, which is braced in the axial direction on the end face 15, toward the valve element 5, of the valve body 3, so that the armature 10 is moved away from the valve insert 2 and is pressed against the valve dome 11 in the region of the valve dead space 13 and rests on the valve dome. In this position of both the valve element 5 and the armature 10, the valve seat 4 is uncovered by the valve element 5, or the conical-caplike region 5C of the valve element 5, and the inflow region 8 communicates with the outflow region 9.

In this state of the valve arrangement 1, the operating medium can be delivered, via the valve arrangement 1, or in other words beginning at the inflow region 8 of the valve chamber 7 to the outflow region 9 of the valve arrangement via the valve seat 4, and to a region, communicating with the outflow region 9, of an ABS (anti-lock brake system), TCS (traction control system), or ESP (electronic stability program) system.

To close the valve seat 4, the electrical module, slipped into a known manner onto the valve dome 11, of the valve arrangement 1 is supplied with current such that the electrical module generates an electromagnetic force, which displaces the armature 10 from its position shown in FIG. 1 in the direction of the valve seat 4 and presses the conical-caplike region 5C of the valve element 5 sealingly against the valve seat 4 of the valve body 3. In this last-described state of the valve arrangement 1, the inflow region 8 is disconnected from the outflow region 9, and no operating medium can be supplied via the valve arrangement 1, if a positive pressure drop exists between the inflow region 8 and the outflow region 9. Here, in the interior of the valve arrangement 1, a positive pressure drop exists between the inflow region 8 and the outflow region 9 if the pressure in the inflow region 8 of the valve chamber 7 is greater than the pressure in the outflow region 9 of the valve arrangement 1.

This is due to the fact that the inflow region 8, when there is a positive pressure drop compared to the outflow region 9 and when the valve seat 4 is closed, is disconnected from the outflow region 9 by a check valve 14; at a negative pressure drop, or in other words in the presence of a pressure in the outflow region 9 that is greater than the pressure in the inflow region 8, the check valve 14 is open.

In the valve arrangement 1 shown in FIG. 1, the spring assembly 6 is disposed with its region toward the valve body 3 in the valve chamber 7, through which, when the valve seat 4 is open, fluid or operating medium-or brake fluid in the case where the valve arrangement 1 is used in an ABS system of a motor vehicle-flows from the inflow region 8 in the direction of the outflow region 9.

Figure 2:
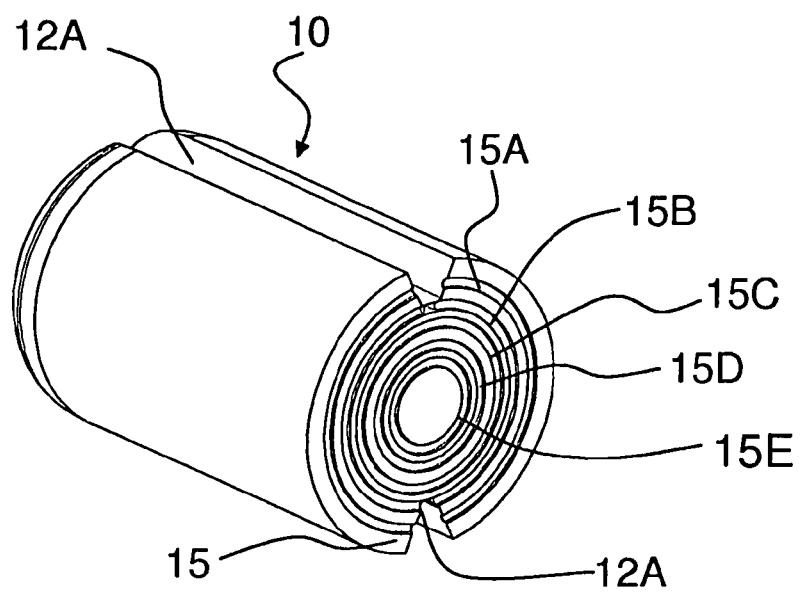
FIG. 2 is a schematic three-dimensional individual illustration of an armature of the valve arrangement of FIG. 1.

In FIG. 2, the armature 10 is shown in a three-dimensional view, in which an end face 15 of the armature 10, facing toward the valve element 5, is shown in further detail. The end face 15 of the armature 10 is embodied with a plurality of circular channels 15A through 15E disposed concentrically to one another, so that a spacing between the end face 15 of the armature 10 and an end face 16 of the valve insert 2, facing toward the end face 15 of the armature 10, varies at least in some regions in the radial direction in such a way that the conditions required, when there is a flow between the valve dead space 14 and the valve chamber 7 in the region between the armature 10 and the valve insert 2, for the occurrence of an effect of the hydrodynamic paradox no longer exists.

Figure 3:
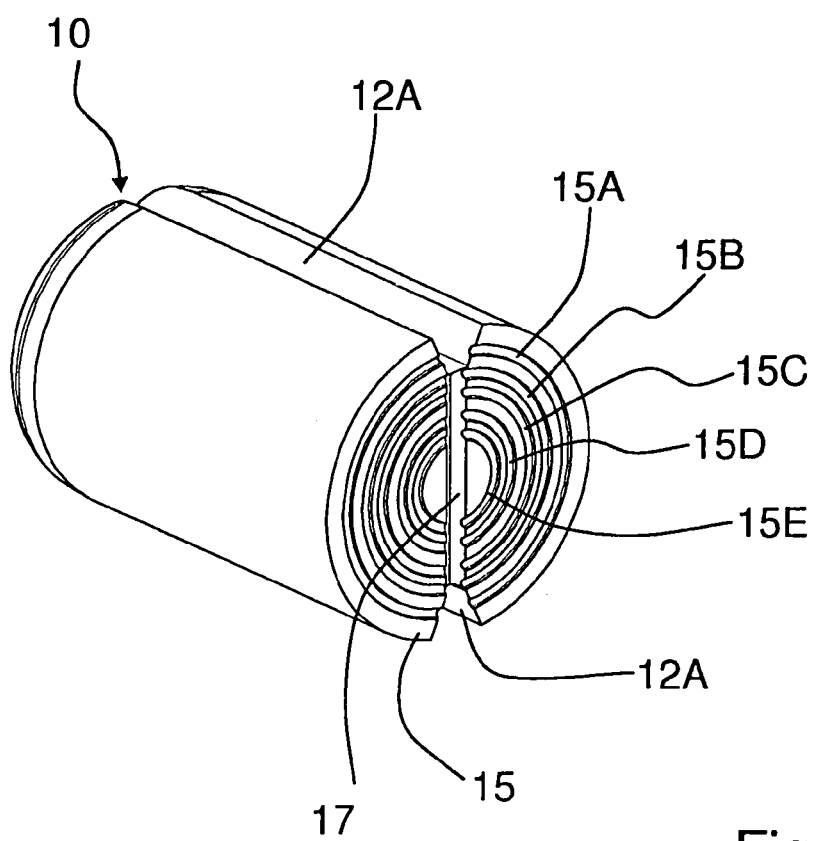
FIG. 3 is an alternative design of an armature of the valve arrangement of FIG. 1, in a view corresponding to FIG. 2.

In FIG. 3, a refinement of the armature 10 shown in FIG. 2 is shown; in the region of its end face 15, it is embodied with a so-called radial groove 17, which is based on essentially the same mode of operation as the aforementioned circular channels 15A through 15E.

As an alternative to the exemplary embodiment of the subject of the invention shown in FIG. 2 and FIG. 3, the end face of the armature and/or the end face, facing toward the armature, of the valve insert may each be embodied with arbitrary geometries, which lend the end face of the armature and/or the end face of the valve insert a surface profile such that there is no uniform spacing between the end faces.

Here, the circular channels 15A through 15E and the radial groove 17 are all embodied with a substantially semicircular profile in cross section; it is understood to be within the judgment of one skilled in the art to embody both the channels and the radial groove, depending on a particular application in question, with other suitable cross-sectional profiles.

The possibility furthermore exists of altering the end face of the armature and/or the end face, toward the armature, of the valve insert microscopically by means of other suitable surface treatment processes, compared to a substantially plane, smooth surface, in such a way that the effect of the hydrodynamic paradox is avoided.

The foregoing relates to preferred exemplary embodiments of the invention, it being understood that other variants and embodiments thereof are possible within the spirit and scope of the invention, the latter being defined by the claims.

The invention claimed is:

1. In a valve arrangement having a valve element, which is disposed longitudinally movably in a valve insert and cooperates with a valve seat embodied in a valve body, which valve element in the installed position is acted upon, by a spring assembly disposed between the valve body and the valve insert, with a force component acting in the opening direction of the valve seat and is actuatable in the closing direction of the valve seat via an electromagnetic actuator, the spring assembly and at least one part of the valve element being disposed in a valve chamber defined by the valve insert in the region of the valve seat, and an end, facing away from the valve chamber of the valve element is operatively connected to an armature, the improvement wherein an end face of the armature, facing toward the valve insert, and/or an end face of the valve insert, facing toward the end face of the armature, is embodied with a surface profile such that a flow cross section, defined by the end faces, varies at least regionally in the radial direction and/or in the circumferential direction of the armature, wherein the end face of the armature and/or the end face of the valve insert is embodied with circular channels extending in the circumferential direction of the armature and wherein the circular channels are spaced apart from one another concentrically in the radial direction.

2. The valve arrangement according to claim 1, wherein the end face of the armature and/or the end face of the valve insert is embodied with at least one channel extending in the radial direction of the armature.

3. The valve arrangement according to claim 2, wherein an outer circumference of the armature includes at least one conduit extending in a longitudinal direction of the armature.

4. The valve arrangement according to claim 1, wherein an outer circumference of the armature includes at least one conduit extending in a longitudinal direction of the aRMature.

* * * * *